DEVICE FOR ELECTRONICALLY PRODUCING CORRECTED COLOR SEPARATIONS BY PHOTOELECTRICALLY SCANNING COLORED ORIGINALS TO BE REPRODUCED

Filed July 18, 1966 2 Sheets-Sheet 1

INVENTOR
Hans Keller
BY Spiel & Spiel
ATTYS.

Aug. 19, 1969 H. KELLER 3,462,546

DEVICE FOR ELECTRONICALLY PRODUCING CORRECTED COLOR SEPARATIONS BY PHOTOELECTRICALLY SCANNING COLORED ORIGINALS TO BE REPRODUCED

Filed July 18, 1966 2 Sheets-Sheet 2

INVENTOR
Hans Keller

BY Sție & Sție
ATTYS.

United States Patent Office 3,462,546 Patented Aug. 19, 1969

3,462,546

DEVICE FOR ELECTRONICALLY PRODUCING CORRECTED COLOR SEPARATIONS BY PHOTOELECTRICALLY SCANNING COLORED ORIGINALS TO BE REPRODUCED

Hans Keller, Molfsee, Germany, assignor to Dr.-Ing. Rudolf Hell Kommanditgesellschaft Kiel, a company of Germany Filed July 18, 1966, Ser. No. 565,944
Claims priority, application Germany, July 21, 1965, H 56,646
Int. Cl. H04n *1/46, 9/12*
U.S. Cl. 178—5.2 3 Claims

ABSTRACT OF THE DISCLOSURE

An arrangement for electronically producing corrected color separations by photoelectrically scanning colored originals to be reproduced, wherein one logarithmic color signal and one logarithmic A.C. color correction signal are employed per color separation, in which positive half waves of the color signal are added to negative half waves of the color correction signal, the resulting summation signal being suppressed if of one polarity, and the negative half waves of the color signal are added to the positive half waves of the color correction signal, the resulting summation signal being suppressed if it is of opposite polarity to the first mentioned summation signal to be suppressed, with the unsuppressed parts of the two sumation signals being added together and added in desired proportion to the uncorrected color signal.

The invention relates to a device for electronically producing corrected color separations by photoelectrically scanning colored originals to be reproduced, utilizing one logarithmic color signal and one logarithmic color correction signal per color separation, by means of electronic analog computers as employed with color scanners and engraving machines in the production of corrected color separations and color separation printers in the electronic and electromechanical reproduction art.

The colored original to be reproduced is pointwise and linewise scanned by means of a flying light spot, and the light beam passing through or reflected from the original is split into two or three beams each of which is passed through a respective color separation filter. Each filtered beam is received by a photocell or a photomultiplier which converts the filtered light signal into a primary electrical color signal, each of such signals so produced being termed an uncorrected color signal or color separation signal. Three such color signals, representative of a colored picture point of the original, established by densimetric analysis theoretically should characterize the ink dosages, i.e., the ink quantities, by means of which the reproduction of a colored picture point of the original is to be made (print, color photograph). However, this holds true only in an initial rough approximation principally because of defects in the color light filters employed and the lack of fidelity of the printing inks utilized so that the color signals require a correction in order to obtain these from the ink dosage signals or the corrected color signals. This correction is achieved, for each color signal of a triple separation, by a color correction signal each of which may be derived from one, two or three primary color signals of said triple separation or from any other color signals, with the color signal to be corrected being additively or multiplicatively modified by the color correction signal.

The correction processes may be carried out by means of signals proportional to transparency, established by photoelectric scanning or by signals proportional to opacity obtained from the former by inversion. Such signals are substantially of multiplicative structure. However, these signals, especially signals proportional to opacity, may be submitted to a logarithmic compression, with the signals then becoming proportional to color density. The computing processes then involve the simpler additive structure, and the analogy to prior photographic masking processes becomes more evident, such processes likewise using addition and subtraction of densities. In the following description the electrical signals are assumed to be proportional to density.

The primary color signals contain both color intelligence and brightness intelligence, i.e., gray intelligence. This holds true for both the color signals and the color signals utilized in correction. If such a correction signal is added to the color signals, not only is the specific ink dosage of the color signal corrected but also the gray portion of the color signal is modified by the gray portion of the correction signal in dependence on the degree of correction. Therefore, it was an improvement in reproduction photography when, by forming the difference of density between the uncorrected photographic color separation and a primary photographic correction mask, a secondary mask, the so-called compensative mask, was established, which contained only color correction values and thus no longer included gray correction values. However, in spite of this improvement, such mask possessed defects so that it has not been successful in the photomechanical reproduction art. The equivalent electronic method, however, readily offers further possibilities of utilization, whereby this avenue was frequently employed, which is also true in the present case.

The processes and relations in such a color correction method may be illustrated by the following example.

The colored picture original to be reproduced may contain, besides white and black, the three primary colors magenta, yellow and cyan and their three primary mixed colors orange, green and violet. If, for example, the maggenta separation is to be made from these colors, the reproduction must be printed with the full reproduction magenta ink, if the colors magenta, orange, violet and black are present in the original. These colors of the original are denoted "quasi-black colors," or more briefly "black colors." Correspondingly, the reproduction must not be printed with the reproduction ink magenta, if the colors white, yellow, green and cyan are present in the original. This is the reason why these colors are denoted "quasi-white colors" or more briefly "white colors." All black colors of the example contain magenta, hence they do not reflect green spectral light and appear black when viewed through a green filter. The white colors reflect green, but not completely, and appear more or less bright when viewed through the green filter. These differences of the brightnesses of the white colors are great and generally greater than the differences of the brightnesses of the black colors. Therefore, the correction of the white colors is dominant. The black colors, however, are likewise not of equal darkness. Above all, the uncorrected color of the original which coincides with the separation color, i.e., magenta in the example, is always somewhat brighter than black, so that too little ink is printed in the reproduction. In reflection pictures, the cyan in the cyan separation is too bright, while in transparent pictures, magenta and yellow in the magenta separation and yellow separation is too bright. The relative distances black to black colors to white to white colors are altered by the white color correction, and first of all, the white colors are approximated in white. However, in the region of the black colors, the distances of the colors from each other remain relatively great. The black colors are to be brought to the black level by the black color correction, if possible, without affecting the white color correction already performed. However, this succeeds only approximately, because of the mutual dependence of the two corrections. Therefore, every color correction is always a compromise between conflicting requirements.

If the density of the uncorrected color signal is vertically plotted in a diagram (such as FIG. 1), and the density of the color correction signal, i.e., that of the primary mask, is horizontally plotted, in the example of the magenta separation, an irregular quadrangle is established in the color plane. Its main diagonal, the "gray line," contains all gray values with the final points of white and black. The lower "white color line" contains all colors which are to have zero density after correction. The upper "black color line" contains all colors which are to have the density of the black value (about 2). As the inclinations of these two lines are different, the color plane is asymmetrically situated with respect to the gray line. A value field representing the density differences, i.e., the compensative mask above mentioned, is symmetrically disposed with respect to the gray line, which itself represents the density difference zero. Remaining color defects result from these asymmetry-symmetry-differences if compensative masks are used. In order to remove these defects, the primary correction signals may first of all be submitted to a special correction in known manner, by means of the uncorrected color signal before the final color correction signal is formed from density differences, in order to obtain a secondary correction signal which establishes a tertiary correction signal with the properties of a compensative mask by forming differences. This method, however, is not satisfactory. The individual processes are not independent from each other and cause difficulties of adjustment and lack clearness.

Another way is to initially establish the compensative mask by forming the density difference, and to vary the mask in order to adapt it to the asymmetry of the color plane. In a known case this was achieved by a nonlinear distortion or limitation with given amplitudes of the difference signal.

In the present instance the problem is, in addition to the known non-influencing of the gray values by the color correction, to make the correction clearly measurable and separately adjustable for the regions of the white colors and the black colors. Furthermore, the correction preferably is to be carried out in connection with a color signal modulated upon a carrier frequency without being required to first rectify and subsequently modulate, i.e., avoiding undesirable expenditure and inaccuracies. It is the object of the present invention to form the difference between the logarithmic uncorrected color signal and the likewise logarithmic color correction signal in a manner corresponding to a compensative mask, and to separate the difference signal into two parts according to its polarity. The two signal parts are separately processed and separately adjusted according to their amplitudes, and added to the uncorrected color signal. The correction signal may be derived from several primary color signals before being subjected to difference formation. Since as a rule the primary color signals used are to be modulated upon a carrier frequency, it would first be necessary to demodulate the signals before the difference is formed. The separation of the difference signal according to its polarity can be very simply achieved by means of rectifiers. Since, in addition to the color correction, as a rule, still further processes have to be effected, the corrected color signals again had to be modulated upon a carrier frequency, which procedure, irrespective of expense, reduces the accuracy of computation. Therefore, only carrier frequency signals are used.

According to a first feature of the invention, means are provided for adding the positive half waves of the color signal to the negative half waves of the color correction signal of opposite phase, together with means for suppressing the summation signal if it is negative, means for adding the negative half waves of said color signal to the positive half waves of said color correction signal of opposite phase, and means for suppressing the summation signal, if it is positive. Means are also provided for adding the unsuppressed parts of said two summation signals, and for adding the resulting A.C. signal representing the white color correction signal with adjustable amplitude to said uncorrected color signal.

According to a second feature of the invention, means are provided for adding the positive half waves of such color signal to the negative half waves of said color correction signal of opposite phase, and means for suppressing the summation signal if it is positive, together with means for adding the negative half waves of said color signal to the positive half waves of said color correction signal of opposite phase, and means for suppressing the summation if it is negative. Means are also provided for adding the unsuppressed parts of said two summation signals, and for adding the resulting A.C. signal representing the black color correction signal, with adjustable amplitude, to said uncorrected color signal. The full color correction, separately adjustable in the two color half phase, is thereby achieved.

Before carrying out color correction, colored gray tones which may be present in the original to be reproduced and which are not permitted to be colored, must be neutralized by means of a gradation control, i.e., a control which permits the adjustment of the range of black to white. This is necessary for all color signals utilized.

In order that the invention may be more clearly understood, reference will now be made to the accompanying drawings, in which.

Figure 1:
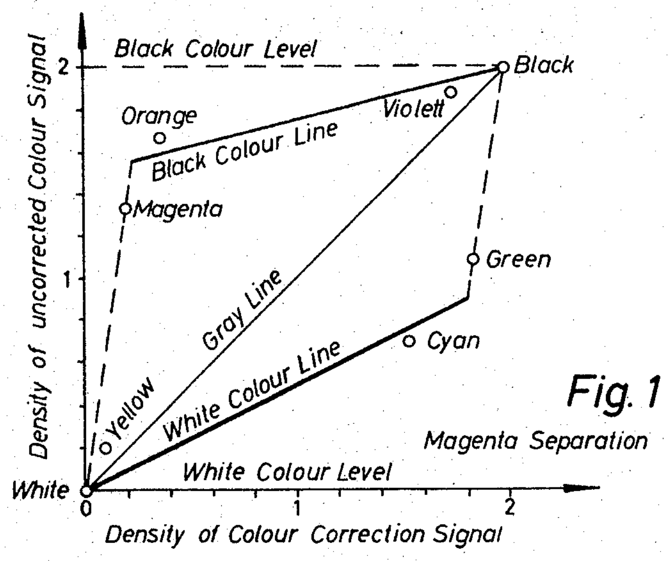
FIG. 1 illustrates in a first diagram the position of the most important fundamental color of the magenta separation in the color plane, prior to color correction.
Figure 2:
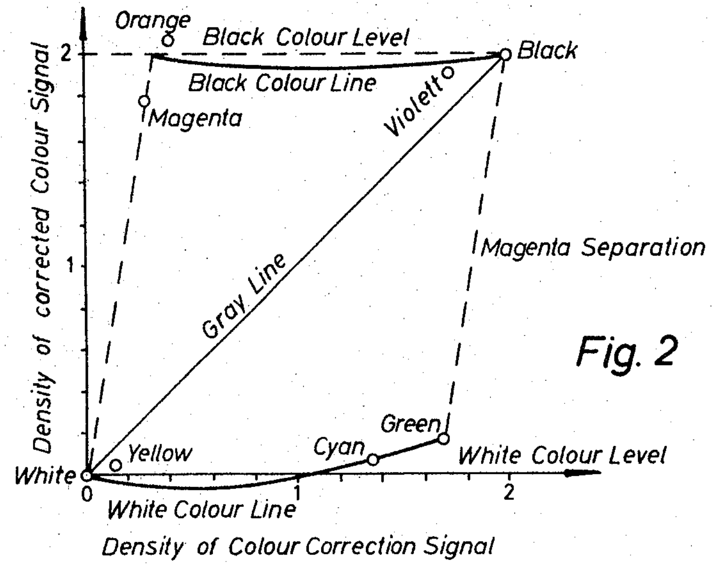
FIG. 2 illustrates in a second diagram the position of these colors of the magenta separation in the color plane, following color correction.

FIGS. 1 and 2 serve for the graphic illustration of the introductory discussion herein. In both diagrams the loci of the most important fundamental colors and their primary mixed colors are plotted, utilizing the magenta separation as an example. FIG. 1 illustrates the situation before and FIG. 2 after color correction. In both diagrams, the coordinate scales are logarithmic, i.e., densities are plotted instead of opacities ($d$=ln0). If the production of the magenta separation is taken into consideration (FIG. 1), the color value relating to the magenta separation when densimetrically analyzing a colored picture point, arises if the point is viewed through a magenta separation filter which is colored green, and the complementary color correction value like relating to the magenta separation, arises if the point is viewed through a filter colored preponderantly magenta and insignificantly cyan. As FIG. 1 indicates the loci of the colors which are to print like white, i.e., green, cyan, yellow and white, are disposed approximately on a straight line, which may be termed the "white color line." Since, after correction, these colors are to have the level of white, they may be termed "white level colors" or merely "white colors." The loci of the colors which are to print like black, i.e., magenta, orange, violet and black, are disposed appproximately on a second straight line, the "black color line" which, however, is not symmetrically disposed relative to the white color line with respect to the gray line connecting the white point with the black point. Since, after correction, these colors are to have the level of black, they may be termed "black level colors" or merely "black colors."

As FIG. 2 illustrates, the colors green, cyan and yellow have, after correction, approximately the level of white, i.e., the dosages of these colors have approximately the same amounts. The colors magenta, orange and violet have, after correction, approximately the level of black, i.e., the dosages of these colors likewise have approximately the same amounts.

Figure 3:
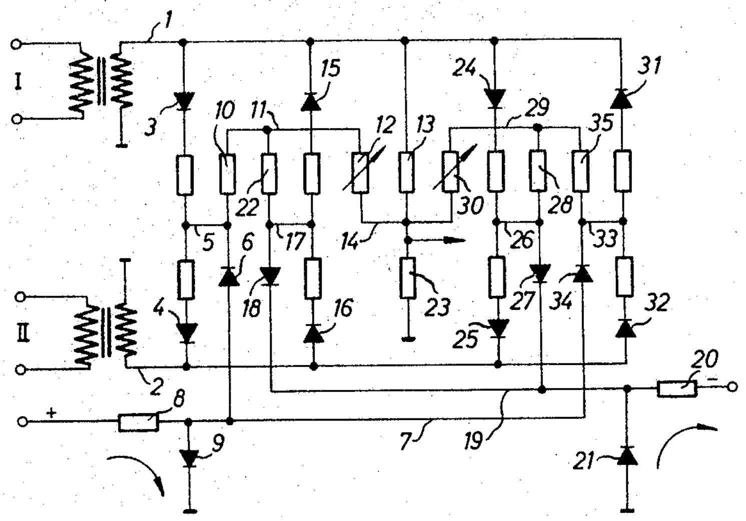
FIG. 3 is a circuit diagram of an analog computer for color correction.

In the circuit of FIG. 3, the uncorrected color signal, modulated upon a carrier frequency, appears at the conductor 1, while the color correction signal, modulated upon a carrier frequency of like frequency and of opposite phase, appears at the conductor 2, both signals having been previously logarithmically compressed and gray corrected. The diode 3 is conductive to only the positive half waves of the color signal, while the diode 4 is constructive for only the negative half waves of the correction signal. The summation signal of both half wave signals appears at the conductor 5 and is shunted by the diode 6 to the conductor 7, if it is negative. The positive potential of the conductor 7 is derived from the voltage drop of the diode 9 which conducts current from the positive terminal of a current source over the resistor 8 to zero potential, and is equal to or somewhat greater than the forward voltage of the diode 6 so that such diode is just becoming conductive when the conductor 5 reaches zero potential. If said summation signal at the conductor 5 is positive, such signal is then added, passing over the resistor 10, the conductor 11, and the variable resistor 12, to the uncorrected color signal supplied over the resistor 13, at the conductor 14.

In like manner, the diode 15 passes only the negative half waves of the color signal, and the diode 16 passes only the positive half waves of the oppositely phased correction signal. The summation signal of the two half wave signals arises in the conductor 17 and is shunted by the diode 18 to the conductor 19, if it is positive. The negative potential in the conductor 19 is derived from the voltage drop of the diode 21 which conducts current from zero potential over the resistor 20 to the negative terminal of the current source, and is equal to or somewhat smaller than the forward voltage of the diode 18 so that the latter is just becoming conductive when the conductor 17 reaches zero potential. If the summation signal in the conductor 17 is negative, such signal is then added, over the resistor 22, the conductor 11, and the variable resistor 12, to the uncorrected color signal supplied over the resistor 13, at the conductor 14. The parts of the two summation signals not shunted, i.e., the positive and the negative summation signal, are added at the conductor 11. This new summation is the white color correction signal which is added, with adjustable amplitude, to the uncorrected color at the conductor 14. The white color corrected signal appears across the resistor 23.

Correspondingly, the black color correction signal is produced in the right half of the circuit diagram of FIG. 3. The diode 24 passes only the positive half waves of the color signal, and the diode 25 passes only the negative half waves of the oppositely phase color correction signal. The summation signal of the two half wave signals appears at the conductor 26 and is shunted by the diode 27 to the conductor 19, if it is positive. If said summation signal at the conductor 26 is negative, such signal is then added, over the resistor 28, the conductor 29, and the variable resistor 30, to the uncorrected color signal supplied over the resistor 13, at the conductor 14.

The diode 31 passes only the negative half waves of the color signal, and the diode 32 passes only the positive half waves of the oppositely phase correction signal. The summation signal of the two half wave signals appear at the conductor 33 and is shunted to the conductor 7 by the diode 34, if it is negative. If said summation signal at the conductor 33 is positive, such signal is then added, over the resistor 35, the conductor 29, and the variable resistor 30, to the uncorrected color signal supplied over the resistor 13, at the conductor 14.

The parts of the two summation signals not shunted, i.e., the negative and the positive summation signal, are added at the conductor 29. This new summation signal is the black color correction signal which is added, with adjustable amplitude, to the uncorrected color signal at the conductor 14. The black color corrected signal appears at the resistor 23. The fully corrected color signal, together with the white color corrected signal, appears across the resistor 23, the former signal being fed to a recording device, as indicated by the arrow.

A sufficient decoupling of the three signals to be added is achieved by the low impedance of the resistor 23 and the high impedance of the resistors 12, 13 and 30. The suppression of the individual summation voltages of one polarity may be respectively achieved, as achieved in FIG. 3, by shunting, e.g., by the parallel connection of crystal diodes, which is advantageous when A.C. signals are used. The characteristic curve of such crystal diodes in the vicinity of the zero point may unfavorably disturb the linearity of the correction function in the vicinity of this point if the signal voltages are small as compared to the voltage drop in the forward direction of the crystal diode. Therefore, the individual summation signals are not directly shunted to zero potential, but to a bias voltage compensating the forward voltage.

However, the suppression of the individual summation voltages, each of a respective polarity, may be achieved by crystal diodes connected in series, but this is advantageous only if D.C. signals are utilized.

Figure 4:
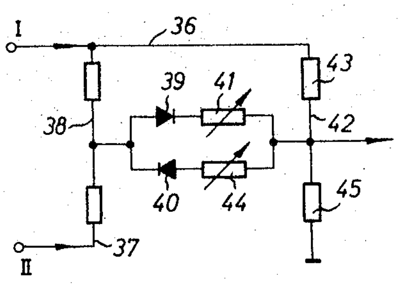
FIG. 4 illustrates a modification of the circuit of FIG. 3.

An embodiment of a circuit with crystal diodes connected in series is shown in FIG. 4.

The uncorrected positive D.C. signal is supplied at the conductor 36, and the negative D.C. correction signal is supplied at the conductor 37, so that the two signals appear in series. Both signals have previously been logarithmically compressed and gray corrected. The difference signal arises at the conductor 38, and by means of the two parallelly connected and oppositely poled diodes 39 and 40, the difference signal is passed, depending on its polarity, only in the upper or only in the lower diode branch. If the difference signal is positive, it is then the white color correction signal. It is conducted over the diode 39 and the variable resistor 41, to the conductor 42, where it is added, with adjustable value, to the uncorrected color signal supplied over the resistor 43. If the difference signal is negative, it is then the black color correction signal. It is similarly conducted, over the diode 40 and the variable resistor 44, to the conductor 42 where it is added with adjustable value to the uncorrected color signal supplied over the resistor 43. Consequently, the fully corrected color signal appears across the resistor 45 and is supplied to a recording device as indicated by the arrow.

The described device is not limited to the use of a single primary correction signal, as the correction signal utilized may be derived, for example, from two or three primary color signals, it being immaterial as to the function of the device whether the derivation is optically achieved as in two channel scanners, or electrically as in multiple channel scanners. The mode of derivation influences only the quality of color correction within the individual color half planes.

Changes and modifications may be made within the scope and spirit of the appended claims.

I claim:

1. A device for electronically producing corrected color separations by photoelectrically scanning colored originals to be reproduced, using one logarithmic A.C. color signal and one logarithmic A.C. color correction signal per color separation, comprising means for adding positive half waves of said color signal to negative half waves of said color correction signal of opposite phase, means for suppressing the resulting summation signal if it is of one polarity, means for adding the negative half waves of said color signal to the positive half waves of said color correction signal of opposite phase, means for suppressing the resulting summation signal if it is of opposite polarity to the first mentioned summation signal to be suppresed, means for adding the unsuppressed parts of said two summation signals, means for adjusting the amplitude of said resulting A.C. signal, and means for adding such resulting A.C. signal, representing the final color correction signal, to said uncorrected color signal.

2. A device according to claim 1, wherein said first mentioned suppression means is constructed to suppress the first summation signal if the latter is negative, and said second mentioned suppression means is constructed to suppress said second summation signal if it is positive, with the A.C. signal resulting from the addition of the unsuppressed parts of said two summation signals representing the white color correction signal.

3. A device according to claim 1, wherein said first mentioned suppression means is constructed to suppress the first summation signals if the latter is positive, and said second mentioned suppression means is constructed to suppress said second summation signal if it is negative, with the A.C. signal resulting from the addition of the unsuppressed parts of said two summation signals representing the black color correction signal.

References Cited

UNITED STATES PATENTS

| | | | |
|---|---|---|---|
| 3,124,036 | 3/1964 | Hell et al. | 178—5.2 X |
| 3,324,235 | 6/1967 | Kyte | 178—5.2 |

RICHARD MURRAY, Primary Examiner

JOHN MARTIN, Assistant Examiner